US011460384B2

(12) United States Patent
Smalley et al.

(10) Patent No.: US 11,460,384 B2
(45) Date of Patent: Oct. 4, 2022

(54) PRESSURE TEST APPARATUS INCLUDING A TOP PLATE ASSEMBLY AND AN AIR BLOCK

(71) Applicant: International Business Machines Corporation, Armonk, NY (US)

(72) Inventors: Douglas Alexander Smalley, Clifton Corners, NY (US); Mateusz Koziol, Poughkeepsie, NY (US); Oswald J. Mantilla, Dutchess, NY (US); Leung M. Hung, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 16/694,800

(22) Filed: Nov. 25, 2019

(65) Prior Publication Data

US 2021/0156776 A1 May 27, 2021

(51) Int. Cl.
 *G01N 3/12* (2006.01)
 *G01N 3/02* (2006.01)
(52) U.S. Cl.
 CPC ............... *G01N 3/12* (2013.01); *G01N 3/02* (2013.01)
(58) Field of Classification Search
 CPC ........ G01N 3/12; G01N 3/02; G01N 15/0826; G01N 3/10; G01N 29/28; G01N 29/04; G01N 29/265; G01N 25/18; G21C 17/01; A61B 5/021; A61B 5/02156; A61B 5/224; C03B 9/41; G11B 23/507; G11B 5/5582; H04R 9/025; H04R 17/005; H04R 9/046; E21B 47/14; B65G 47/902; G01L 5/00; G01M 5/00; G01M 3/3236; G01B 7/008
 See application file for complete search history.

(56) References Cited

U.S. PATENT DOCUMENTS

| | | | |
|---|---|---|---|
| 5,369,990 A | 12/1994 | Zurek | |
| 5,693,887 A | 12/1997 | Englund | |
| 6,019,126 A * | 2/2000 | Kelada | F16K 37/0083 137/554 |
| 6,826,957 B2 * | 12/2004 | Martone | G01M 3/3236 73/497 |
| 8,078,413 B2 | 12/2011 | Levy | |
| 8,544,315 B2 | 10/2013 | Guazzo | |
| 9,390,565 B2 | 7/2016 | Thompson | |
| 9,429,493 B2 | 8/2016 | Halliwill | |

FOREIGN PATENT DOCUMENTS

WO 2006061302 A1 6/2006

OTHER PUBLICATIONS

Sagi, Hemi, "Advanced Leaktest Methods", Director ATC, Inc., printed on May 16, 2019, <http:atcinc.net/wp-content/uploads/2013/09/Advanced-Leak-Testing-Methods.pdf>, 6 pages.

* cited by examiner

*Primary Examiner* — Brandi N Hopkins
(74) *Attorney, Agent, or Firm* — Alexander G. Jochym

(57) ABSTRACT

A pressure test apparatus is provided for performing a pressure test on a part. The method of pressure testing the includes attaching the part to the pressure test apparatus and moving down a top plate assembly of the pressure test apparatus, where the moving down of the top plate assembly engages a connection to a transducer for the pressure test and blocks a connection to an air supply to the pressure test apparatus. Furthermore, the method includes measuring a level of pressure in the part.

20 Claims, 7 Drawing Sheets

PRESSURE TEST APPARATUS INCLUDING A TOP PLATE ASSEMBLY AND AN AIR BLOCK

The present invention relates generally to pressure testing apparatus, and more particularly to pressure test apparatus to test a level of pressure of incoming parts.

Pressure testing is important for verifying an ability of incoming components that may be used in equipment or systems requiring containment of fluids or gases, to achieve or have a required level of pressure and to maintain a required pressure level. Evaluating an ability of a component, vessel, or elements of a system to provide a minimum level of pressure is important in determining the integrity of the component. Pressure testing of individual components and/or systems can be accomplished by several methods. Two commonly used methods of pressure testing include pneumatic pressure testing and hydrostatic pressure testing. A hydrostatic pressure test is performed by using water as the test medium, whereas a pneumatic test uses air, nitrogen, or any non-flammable and non-toxic gas. Various types of pressure testing apparatus are available using both pneumatic and hydrostatic pressure testing methods. Equipment used for pressure testing can be an off the shelf pressure tester or a custom pressure tester developed for specific applications and/or for specific components.

SUMMARY

Embodiments of the present invention present a pressure test apparatus with a top plate assembly including an air block, an upper transducer column encasing a transducer, and a lower transducer column where the top plate assembly moves vertically over a base of the pressure test apparatus. The pressure test apparatus includes an upper portion of a first connection within the upper transducer column that provides a connection to the transducer and to a lower portion of the first connection in a holding plate containing the lower portion of the first connection. Additionally, the holding plate attaches to a T-block in the base of the pressure test apparatus. The pressure test apparatus further includes a passageway within the base of the pressure test apparatus connects one of the part in a second connection to the transducer and an air source in a third connection to the part, wherein the second connection joins the part to the pressure test apparatus and the third connection joins the air source to the pressure apparatus.

Furthermore, embodiments of the present invention disclose a method to perform a pressure test using the pressure test apparatus. The method includes attaching a part to the pressure test apparatus and moving down the top plate assembly of the pressure test apparatus, where moving down the top plate assembly engages a connection to a transducer and blocks a connection to an air supply to the pressure test apparatus during the pressure test. Additionally, the method includes measuring a level of pressure in the part.

DETAILED DESCRIPTION

Figure 1:
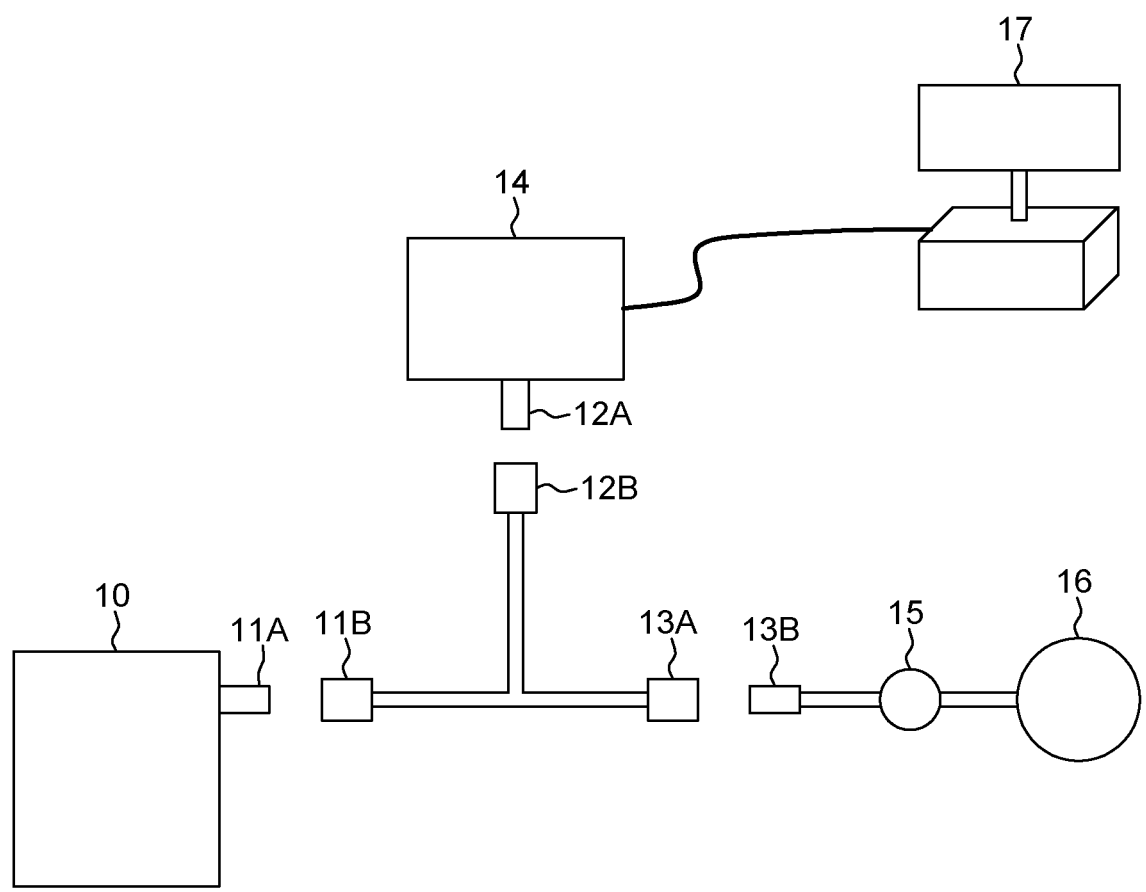
FIG. 1 is a system diagram illustrating some components of a pressure test apparatus for testing pressure parts, in accordance with an embodiment of the present invention.

Embodiments of the present invention recognize that various components require pressure testing. Embodiments of the present invention recognize that for various applications in a manufacturing environment pressure testing of incoming parts or other components is required. Embodiments of the present invention recognize that incoming components may be required to keep fluids or gaseous elements into or out the component or into or out of areas of a subassembly or of a completed system.

Embodiments of the present invention recognize that inadvertently pressure testing a part with a house air line or other air source attached can lead to a situation where an incoming part or component incorrectly passes a pressure test due a level of pressure provided to a transducer in the pressure test apparatus by the house air line when the part does not have a required level of pressure.

Embodiments of the present invention recognize that successfully making a plurality of connections in the pressure test apparatus, such as, connections to the part, connections to the transducer, and in some cases, a connection to the house air with multiple connectors, various hoses, or pipes can be challenging, particularly in a manufacturing environment, where operator training, operator attention, and efforts to increases manufacturing output can be sources of errors in pressure testing.

Embodiments of the present invention recognize that an incoming component requiring pressure testing may not pass an initial pressure test and may require additional pressure testing, such as a pressure decay test, where the incoming component may be re-pressurized using an in-house pressurization source, such as an in-house air-line.

Embodiments of the present invention recognize that pressure test equipment commonly requires pressure sensors or transducers sensitive to handling damage within the pressure testing apparatus which can sustain damage during pressure testing and when the pressure sensors or transducers are removed from a pressure tester for routine calibration.

Embodiments of the present invention provide a pressure test apparatus that prevents an operator from attaching the house air line or leaving the house air line attached to the pressure test apparatus during a pressure test. Embodiments of the present invention provide a pressure test apparatus with a top plate assembly that integrates a physical tab or extension that blocks a connection to the house air line when the top plate assembly is pressed down connecting a quick connect that provides a portion of a passageway or path from the engaged quick connect to the transducer for the pressure test.

Embodiments of the present invention include the top plate assembly of the pressure test apparatus integrated with a transducer column encasing a transducer and a female portion of a quick connect. Embodiments of the present invention provide quick connects that join the transducer to the incoming part undergoing a pressure test when the top plate assembly is lowered. Lowering the top plate assembly causes the quick connects to join. Embodiments of the present invention provide a way to use quick connects between the transducer and a cavity in the base with a T-connection of air channels, pipes, or hoses to the incoming part for pressure test and to the house air line to pressurize the part. Embodiments of the present invention provide three sets of quick connects for easy and quick connection and release by operators of the part to the pressure test apparatus, of the part to the house air line, and of the part to the transducer during a pressure test.

Embodiments of the present invention provide a protective housing for a transducer in the pressure test apparatus to minimize handling damage to the transducer during component testing and during transducer removal from the pressure test apparatus for required calibration test of the transducer which may occur on an annual, a monthly, or daily basis in the manufacturing environment. Embodiments of the present invention provide a pressure testing apparatus capable of preventing a source of air or pressure to the component during a pressure test, such as, provided to the part through a connection to a house air-line. The pressure test apparatus mechanically blocks access to the air-line when the top plate assembly is lowered for the pressure test. Embodiments of the present invention provide an air block that is an extension of a side of the top plate assembly which covers at least a portion of the house air connection to the pressure test apparatus. Implementation of such embodiments may take a variety of forms, and exemplary implementation details are discussed subsequently with reference to the Figures.

As will be appreciated by one skilled in the art, aspects of the present invention may be embodied as a method, apparatus, or system. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," "apparatus," or "system." Furthermore, aspects of the present invention may take the form of a computer program product embodied in one or more computer-readable media having computer readable program code/instructions embodied thereon.

The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a system diagram 100 illustrating some components of a pressure test apparatus used in pressure testing of incoming components, in accordance with an embodiment of the present invention. As depicted, FIG. 1 (not drawn to scale) includes part 10, transducer 14, regulator 15, house air 16, computer 17, and connects 11A, 11B, 12A, 12B, 13A, and 13B. In various embodiments, system diagram 100, is not limited to pressure testing incoming parts but, could be a system diagram for pressure testing a sub-system, a part of equipment, or fully assembled piece of equipment for air or fluid pressure of a vessel, component, or system for seal integrity (e.g., for incoming quality, periodic quality testing, annual, or other testing) using various test methodologies including static pressure testing, decay testing, or other known pressure testing methodologies. For example, various embodiments of system diagram 100, can provide testing of air pressure, of pressure fluid pressure, or a pressure decay testing.

As depicted, FIG. 1 includes part 10 that can be connected to pressure test apparatus that is composed of at least connections 11B, 12A, 12B, 13A, and transducer 14, where these elements, illustrated in FIG. 1, may be connected within the pressure test apparatus by various hoses, pipes, cavities, or air channels (not depicted in FIG. 1). In various embodiments, connections 11A, 11B, 12A, 12B, 13A, and 13B are each a portion of a self-sealing quick connect. Self-sealing quick connects close preventing air or fluid flow as soon as each of the quick connects are no longer joined. While the three quick connects are depicted as connection 11A on part 10 with connection 11B in the pressure test apparatus, connection 12A with connection 12B in the pressure test apparatus, and connection 13A in the pressure test apparatus with connection 13B on the air source or water line in the system diagram of the pressure tester in FIG. 1, the portions of the three quick connects in the pressure test apparatus in FIGS. 2-8 are labeled as part connect 33 for connection 11B, female connect 80 for connection 12A, male connect 32 for connection 12B, and air connect 31 for connect 13A. As known to one skilled in the art, when connection 11A is not engaged or joined with connection 11B, air or fluids cannot enter or leave either of connection 11A or 11B. As depicted, the pressure test apparatus can be connected to house air 16 using regulator 15 to monitor or regulate air flow for pressurization of part 10, for example, during a pressure decay test of part 10. In various embodiments, computer 17 is connected to the pressure test apparatus.

In various embodiments, part 10 represents a part or component requiring pressure testing using pressure test apparatus. In various embodiments, part 10 is a component used in assembly of a large-scale water-cooled computer system. For example, part 10 is a manifold used in a large-scale water-cooled computer system. Part 10 is not limited to a component for a large-scale water-cooled computer system but, could be part, component, vessel, sub-assembly or assembly of components in any type of equipment or can be a part for standalone use. In various embodiments, part 10 is any part requiring pressure testing on pressure test apparatus to verify a level of pressure of part 10. Pressure testing of part 10 may verify a seal integrity of part 10 (e.g., ability to prevent liquids or gases from escaping part 10 or to ensure that part 10 is effectively sealed from one or more liquids or gases). In an embodiment, part 10 is an incoming part with an as received level of pressure. In various embodiments, a pressure test of part 10 is done to ensure that part 10 meets a required minimum level of pressure when part 10 is initially undergoes initial pressure testing.

Connection 11A may be associated with part 10 or included in part 10. Connection 11A connects to connection 11B in the pressure test apparatus. Connections 11A and 11B must be joined in order to perform pressure testing of part 10. In various embodiments, connection 11A of part 10 and connection 11B to pressure test apparatus are quick connects. For example, connections 11A and 11B use known female and male components that form a quick connection between part 10 and the pressure test apparatus (e.g., quick connects with a cylinder and a spring-loaded collar that snap together by pressing together or twisting connections 11A and/or 11B to connect). Connection 11A may be the male connection on part 10 and connection 11B may be the female connection on pressure test apparatus or vice versa. Connections 11A and 11B are not limited to quick connections but may be press-fit connections between part 10 and the pressure test apparatus. Connections 11A and 11B can be any two suitable elements that may joined together or connected to provide a hermetic seal or air tight seal between part 10 and the pressure test apparatus.

Connections 12A and 12B connect an air channel within the pressure test apparatus to transducer 14 where the air channel within the base of the pressure test apparatus can be a machined channel, a molded channel, a hose, a pipe, or other air passageway within pressure test apparatus from part 10 to transducer 14. Connection 12A may be an upper connection and connection 12B may be a lower connection in a set of quick connects. In various embodiments, connections 12A and 12B are self-sealing quick connects where each connect of a pair of self-sealing quick connects closes when not engaged or connected to another quick connect. In one embodiment, connections 12A and 12B are male and female portions of a quick connect fitting or quick connect coupler that can be a push-to-connect fitting or connector but, are not limited this type of quick connect. Connections 12A and 12B can be made with any suitable quick connect technology or quick connect parts. In various embodiments, connections 12A and 12B are engaged or joined together when a top plate assembly (not depicted) is lowered, the quick connect consisting of connection 12A and connection 12B are joined. When the top plate assembly raises, a collar (not depicted) on connection 12B (e.g., a female portion of the quick connect) is lifted, connection 12A and connection 12B are disconnected or separated.

When connection 12A is engaged with connection 12B, an air channel is connected between transducer 14 and part 10. When connections 12A and 12B are not engaged, each of connection 12A and 12B have a self-sealing capability that closes of each of connection 12A and 12B to prevent air or fluids from entering or exiting through connection 12A or connection 12B. In various embodiments, connections 12A and 12B provide quick, easy connections that are error free or almost error free connections to release transducer 14, encased in a protective housing (not depicted in FIG. 1), for calibration, transducer 14 replacement or any other purpose.

In various embodiments, connections 13A and 13B connect house air 16 through regulator 15 to transducer 14 using the air channel within pressure test apparatus base. As depicted, connection 13A is associated with the pressure test apparatus providing a path for air to part 10. Connection 13B, as depicted, is a connection, such as a quick connect, for house air 16 coming through regulator 15 to the pressure test apparatus when connections 13A and 13B are joined. In various embodiments, a connection of connection 13A to connection 13B is physically blocked during a pressure test by a portion of a top plate assembly of the pressure test apparatus, as will be discussed later in detail with respect to FIGS. 3 and 8. In one embodiment, connection 13A and 13B are one of a press fit connection or a screw-in type connection. In various embodiments, connections 13A and 13B are self-sealing quick connects.

In various embodiments, transducer 14 is a transducer or pressure sensor. For example, transducer 14 is a device that converts variations in a pressure to an electrical signal. Transducer 14 can be any type of pressure sensing device capable of measuring an air pressure of part 10. In some embodiments, transducer 14 is used to measure pressure of part 10 and to measure changes of pressure in part 10 in a pressure decay test of part 10. In some embodiments, transducer 14 is used in the pressure test apparatus to verify part 10 is hermetically sealed. In various embodiments, transducer 14 can be composed of any type of pressure sensitive element such as a capacitive pressure sensor, a piezo-resistive pressure sensor, strain gauge pressure sensor, or the like that is capable of measuring at least one of absolute pressure, differential pressure, pressure relative to a fixed pressure, or the like to provide a pressure measurement or a level of pressure of the part in the pressure test apparatus. In one embodiment, transducer 14 is gauge pressure transducer. For example, transducer 14 uses a micro machined silicon transducer connecting to a high speed USB output to connect to a computer, such as, computer 17 in FIG. 1. Regulator 15 can be a component within or is a part of a house air line. Regulator 15 can be used to control or regulate air flow and/or air pressure from house air 16 to the pressure test apparatus. In various embodiments, regulator 15 can regulate air pressure provided to part 10 through connection 13B and 13A for a pressure decay test. House air 16 can be any in-house air line, portable air pump, or air source. In various embodiments, house air 16 is used in a manufacturing process or manufacturing area associated with part 10 or an assembly process utilizing part 10.

In various embodiments, computer 17 can be any type of computing device capable of receiving, analyzing, sending, and/or storing pressure test data from pressure test apparatus. For example, computer 17 can be a laptop computer, a mobile computing device, a smartphone, a desktop computer, a mainframe computer, or a connected group of computers as may be used in a cloud computing environment and may include one or more storage devices. In various embodiments, computer 17 can be connected to one or more other computers in a network such as a local area network or the Internet by one or more wireless or wired interconnections. As depicted, computer 17 is electrically connected to transducer 14, for example, by a wired connection or in some embodiments, by a wireless connection.

Figure 2:
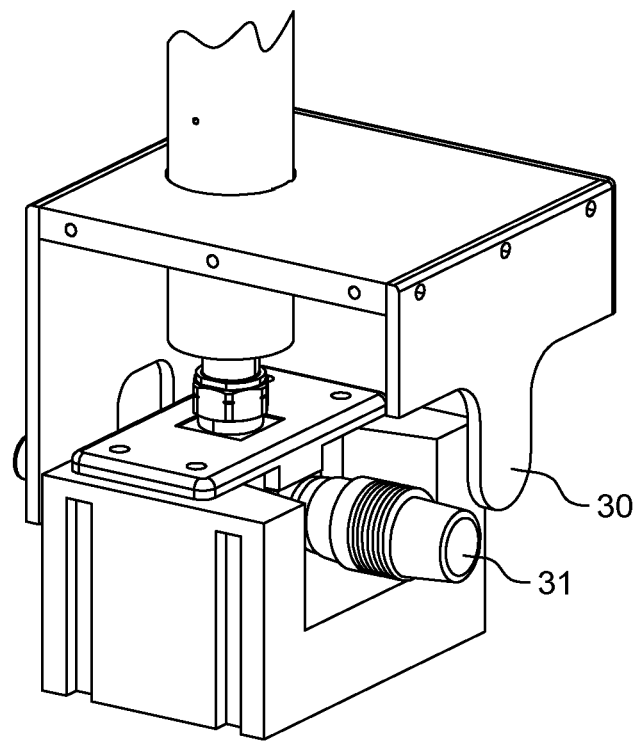
FIG. 2 is an illustration of the pressure test apparatus when a pressure transducer is disengaged, in accordance with an embodiment of the present invention.

FIG. 2 is an illustration of the pressure test apparatus when a pressure transducer is disengaged in accordance with an embodiment of the present invention. The pressure test apparatus is illustrated FIG. 2 with one side panel removed to display interior parts of the pressure test apparatus that will be discussed later in detail with regard to FIGS. 4, 5, 6, 7, and 8. FIG. 2 is only intended as an illustration of the pressure test apparatus when the transducer (not depicted in FIG. 22) is not engaged for a pressure test, such as, before or after a pressure test. When the transducer is not engaged, air connect 31 on the right side of the pressure test apparatus is not blocked by air block 30 of the pressure test apparatus. As depicted in Figure, air connect 31 may be connected to an air source. In this illustration, the top portion of the pressure test apparatus (e.g., a top plate assembly) is in a raised position providing access to air connect 31. In this case, no pressure testing of a part occurs as the transducer is not engaged and the house air may be connected to the pressure test apparatus.

Figure 3:
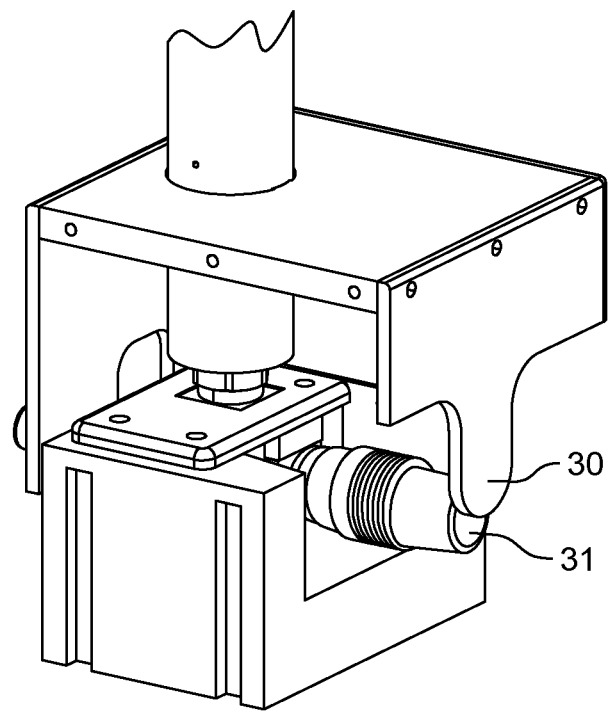
FIG. 3 is an illustration of a portion of the pressure test apparatus when the pressure transducer is engaged for a pressure test, in accordance with an embodiment of the present invention.

FIG. 3 is an illustration of the pressure test apparatus when the pressure transducer is engaged for a pressure test, in accordance with an embodiment of the present invention. The pressure test apparatus also has the side panel removed in FIG. 3. Each of the elements of FIG. 3 are discussed in detail later with reference to FIGS. 4, 5, 6, 7, and 8. FIG. 3 is only intended as an illustration of the pressure test apparatus during a pressure test when the connection to air connect 31 is blocked by air block 30. The pressure test apparatus as illustrated in FIG. 3 is in a position for pressure testing with the quick connect (e.g., connection 12A and 12B in FIG. 1) joined and the transducer (transducer 14 in FIG. 1) engaged for the pressure test. When the top portion of the pressure test apparatus is lowered, as depicted, air connect 31 is blocked by air block 30. The pressure test may occur when the top portion of the pressure test apparatus is lowered, the transducer is engaged, air connect 31 is blocked by air block 30, and a part is attached to the pressure test apparatus (e.g., connection 11A and connection 11B in FIG. 1 are joined).

The pressure test apparatus, as illustrated in FIG. 3, prevents an improper connection of the part to house air at air connect 31 by an operator during a pressure test. If the house air is connected to the pressure test apparatus during a pressure test, a failing part with an insufficient pressure will not be identified (e.g., house air is providing pressure to the transducer and the part during the pressure test).

Figure 4:
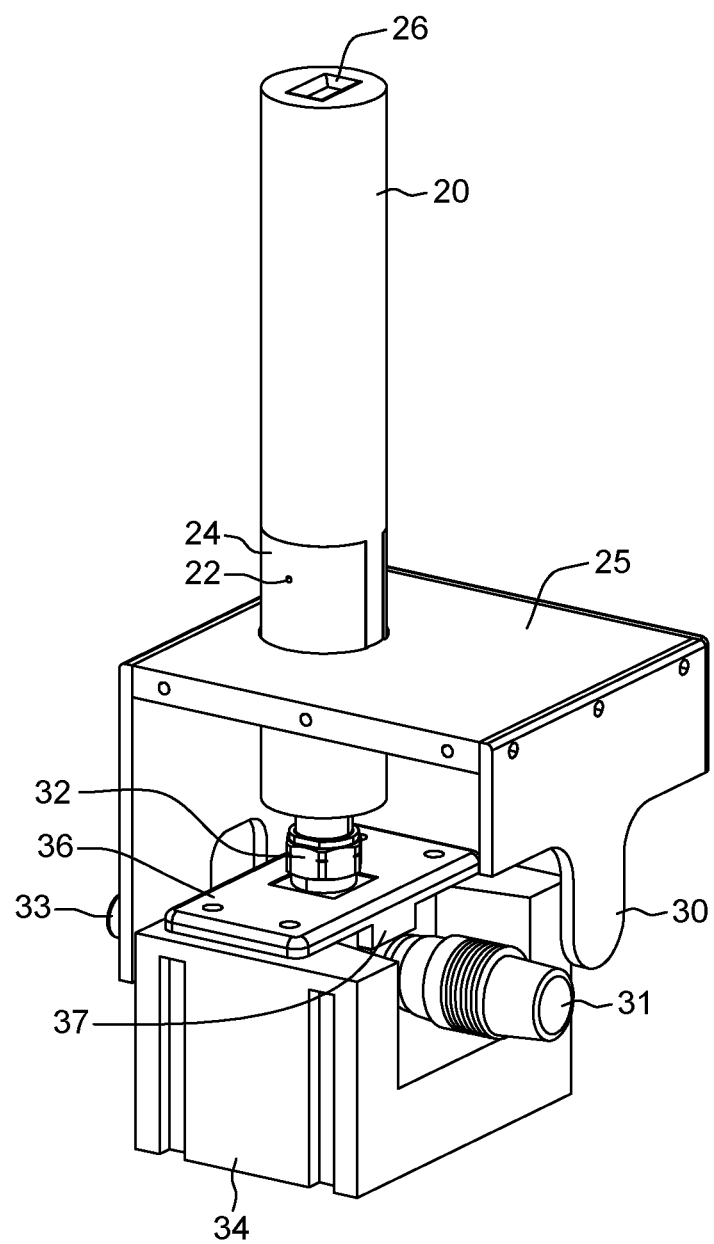
FIG. 4 is an illustration of components of an upper portion of the pressure test apparatus, in accordance with an embodiment of the present invention.

FIG. 4 is an illustration of components of an upper portion of the pressure test apparatus, in accordance with an embodiment of the present invention. It should be appreciated that FIG. 4 provides only an illustration of one implementation and does not imply any limitations with regard to different embodiments that can be implemented. Many modifications to the depicted embodiments can be made. FIG. 4 depicts key elements to describe pressure test apparatus operation. For brevity, a number of commonly used elements in pressure test apparatus are not depicted.

FIG. 4 is an illustration of pressure test apparatus with a side section of top plate assembly 25 removed to view portions of a portion of lower transducer column (LTC) 24, a portion of upper transducer column (UTC) 20, screws 22 connecting LTC 24 to UTC 20, universal serial bus (USB) port 26, air block 30 that is a portion of top plate assembly 25, T-block 37 with hold down plate 36 that holds a portion of male connect 32, air connect 31, part connect 33, and base 34 that holds T-block 37 and an air flow passage (not depicted) which may consist of one or more of air hoses, pipes, or a cavity between house air connect 31, part connect 33, and male connect 32. In one embodiment, the air flow passage or passageway is a cavity that is machined and holds plastic pipes in a three-way joint or T-connection from air connect 31, part connect 33, and male connect 32.

In various embodiments, top plate assembly 25 connects to a transducer column composed of UTC 20 and LTC 24 which encase and protect the transducer (not depicted in FIG. 4). Top plate assembly 25 includes air block 30. While air block 30 is depicted as a rectangular extension of a side of top plate assembly 25 with a semi-circular end, a shape of air block 30 is not limited to this shape. For example, air block 30 may be a longer extension of the side of top plate assembly 25, a bar extending down, a rod, a triangular shaped extension, or the like. In various embodiments, air block 30 partially or completely blocks air connect 31 to an air source, such as, a house air line during a pressure test of a part. Air block 30 prevents attachment to air connect 31 when top plate assembly 25 is lowered into a position engaging the transducer for a pressure test when male connect 32 joins to a female portion of a quick connect (not depicted in FIG. 4).

In various embodiments, top plate assembly 25 includes a top surface or portion with four sides extending downward where one of the four sides adjacent to house air connect 31 extends down creating air block 30. Top plate assembly 25 also includes a central column composed of UTC 20, LTC 24, USB port 26, screws 22, male-female hex thread adapter (not depicted), and a female connect of a quick connect (not depicted). Top plate assembly 25 may move vertically (e.g., up and down) using a central column in top plate assembly 25 composed of UTC 20, LTC 24, and the components within UTC 20 and LTC 24, and a portion of male connect 32 (e.g., a male portion of connections 12A and 12B in FIG. 1). The four sides of top plate assembly 25 slide up and down around base 34 to provide additional stability to pressure test apparatus as top plate assembly 25 moves up and down. In various embodiments, top plate assembly 25 and base 34 provide added stability when protrusions or tabs (not depicted) in one or more sides of top plate assembly 25 mesh or interlace with slots 34A (depicted in FIG. 7) in base 34 as top plate assembly 25 moves up and down. In various embodiments, top plate assembly 25 including air block 30, UTC 20, LTC 24 and the components encased in UTC 20 and LTC 24, such as, the transducer (not depicted) and a female portion of the quick connect (not depicted) move together as a unit during pressure testing of a part.

In various embodiments, UTC 20 is a portion of a hollow column, as depicted later in FIG. 5, that encases a transducer (not depicted), such as transducer 14 in FIG. 1, a female portion of a quick connect (not depicted), such as, a female connection of connections 12A and 12B in FIG. 1), and connections to USB port 26. In an embodiment, UTC 20 encases a portion of a male-female hex thread adapter partially embedded in top plate assembly 25 that connects the transducer to the female portion of the quick connect (e.g., the female portion of connections 12A and 12B in FIG. 1). In various embodiments, UTC 20 can provide a protective housing for the transducer as UTC 20 is removed from pressure test apparatus for calibration or replacement.

In various embodiments, UTC 20 connects to LTC 24 by a pair of screws 22 for an easy release of UTC 20 from LTC 24 and the pressure test apparatus. Screws 22 can be unscrewed to release UTC 20 from LTC 24. The combination of UTC 20 and LTC 24 provides protection to the transducer during pressure testing. Further detail and discussion of UTC 20 is provided later with respect to FIG. 5.

In various embodiments, LTC 24 encases a lower portion of UTC 20, the female connect of the quick connect, and a portion of male connect 32 of the quick connect. In various embodiments, LTC 24 passes through a top surface of top plate assembly 25 and moves with top plate assembly 25. LTC 24 may be held to top plate assembly 25 by one or more of the following a press fit of LTC 24 into c-shaped cut-outs of top plate assembly 25 (depicted in FIG. 7), an adhesive joining LTC 24 to top plate assembly 25, a screw connection joining LTC 24 to top plate assembly 25, tabs in UTC 20, and screws 22 holding LTC 24 to UTC 20. LTC 24 may be considered as a portion of top plate assembly 25.

In various embodiments, LTC 24 includes a ring (not depicted in FIG. 4) on the bottom surface or bottom edge of LTC 24 which pulls up on the collar of the female portion of the quick connect (not depicted in FIG. 4) in order to release the quick connect when a pressure test is complete.

As discussed later in detail with respect to FIG. 8, when top plate assembly 25 with LTC 24 is moved upward after a pressure test, the movement of the ring of LTC 24 on the collar of the female portion of the quick connect and releases the connection of the quick connects.

In various embodiments, air connect 31 is located on a same side of base 34 as air block 30 on top plate assembly 25. Air connect 31 can connect the pressure test apparatus to an in-house air line or air source for pressurizing a part. In an embodiment, air connect 31 connects a water line to the pressure test apparatus when pressure test apparatus tests a water pressure or a water tight seal of a part rather than testing an air pressure or air tight seal of the part. In various embodiments, air connect 31 is a portion of a self-sealing quick connect, as discussed in detail with respect to connection 13A in FIG. 1. Air connect 31 may be any type of self-sealing quick connect commercially available providing a proper size and shape connection to attach an air source to pressure test apparatus. In some embodiments, air connect 31 is a screw type connection or a press-fit connection.

In various embodiments, air connect 31 is physically blocked by air block 30 when top plate assembly 25 is lowered to connect male connect 32 with a female portion of the quick connect for a pressure test (e.g., as depicted in FIG. 3). Similarly, in various embodiments, air connect 31 is not blocked by air block 30 on top plate assembly 25 when top plate assembly 25 is in a raised position as depicted previously in FIGS. 2 and 4. For example, air connect 31 can be unblocked when the transducer (not depicted) is not engaged (e.g., male connect 32 and the female portion of the quick connect are not snapped together or joined). House air 31 may be unblocked when pressurizing a part, for example, or a pressure decay test.

In various embodiments, male connect 32 is a male portion of a self-sealing quick connect. As depicted, male connect 32 is embedded in hold down plate 36 in T-block 37. Male connect 32 is discussed in detail later with respect to FIG. 8.

In various embodiments, hold down plate 36 is connected to T-block 37 by one or more of screws, press-fit pins, nuts and bolts, or an adhesive material. In an embodiment, hold down plate 36 is integrated into T-block 37 (e.g., molded or machined as a part of T-block 36). In one embodiment, hold down plate 36, T-block 37, and base 34 are included as a single piece in pressure test apparatus. In various embodiments, hold down plate 36 and T-block 37 include a portion of male connect 32 providing a portion of an air passageway to a common cavity in base 34. The common cavity or cavity within base 34 provides an area for connections to each of house air connect 31, part connect 33, and to male connect 32. In various embodiments, each of hold down plate 36, T-block 37, and base 34 are one of a molded plastic material, a machined plastic material, a machined metal, a molded metal, or a composite material. For example, hold down plate 36, T-block 37, and base 34 are composed of a machined, durable plastic material.

In various embodiments, base 34 includes a common cavity with one or more of one or more air hoses, one or more pipes, a chamber, a tunnel, or a combination of these for an airway providing a passageway connecting air connect 31 to part connect 33 and part connect 33 to male connect 32 of the quick connect. In various embodiments, the airway or passageway connects air connect 31 to part connect 33, and male connect 32 in a three-way connection, such as, a T-joint, a T-shaped chamber, or a T-connector. For example, base 34 may provide a cavity which encases a T-joint section of air hoses that connect via a 3-way connection or a 3-way connector in the cavity of base 34.

In various embodiments, base 34 connects to a workbench for stability and accessibility. In various embodiments, base 34 includes one or more vertical slots on two sides that provide additional stability to top plate assembly 25 as top plate assembly 25 is moved up and down during pressure testing and during a pressure decay test. In these embodiments, top plate assembly 25 includes one or more matching tabs or protrusions, such as, rectangular protrusions (not depicted) which fit within slots 34A in base 34. The rectangular protrusions (not depicted) of slightly smaller dimensions than the dimensions of slots 34A in order to allow top plate assembly 25 to move easily and yet, provide stability to top plate assembly 25 as top plate assembly moves up and down around base 34.

In various embodiment, part connect 33 is a portion of a self-sealing quick connect connecting a part for a pressure test to pressure test apparatus. Part connect 33 can be in base 34 as discussed previously with respect to FIG. 1. In some embodiments, part connect 33 is a press-fit connection or a screw-in connection of a part to pressure test apparatus.

Figure 5:
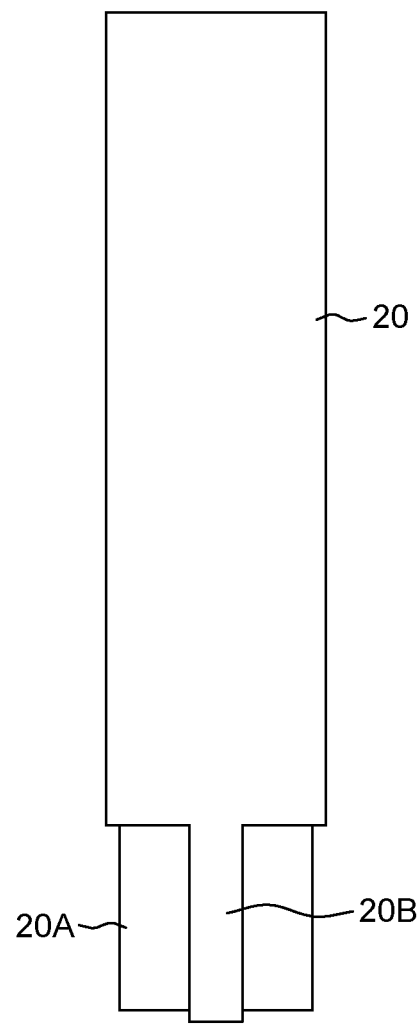
FIG. 5 is an illustration of an upper transducer column when removed from the pressure test apparatus, in accordance with an embodiment of the present invention.

FIG. 5 is an illustration of UTC 20 as UTC 20 is removed from the pressure test apparatus, in accordance with an embodiment of the present invention. As depicted, FIG. 5 includes UTC 20 with bottom edge 20A and tab 20B of UTC 20. In various embodiments, UTC 20 is a hollow column encasing a transducer (not depicted), a portion of a male-female hex thread adapter (not depicted) connected through the top plate assembly (not depicted), a female portion of the quick connect (not depicted) and wires connecting to a USB port (not depicted). The elements not depicted in FIG. 5 are depicted and discussed later with respect to FIG. 8. UTC 20 and LTC 24 (not depicted) each can be a molded or machined plastic or metal part. In various embodiments, bottom edge 20A rests on the top surface of the top plate assembly. As depicted, a pair of tabs 20B extend into matching slots in the upper transducer column (e.g., LTC 24 not depicted in FIG. 5). Tabs 20B form legs, tabs, or protrusions that engage LTC 24 slots (e.g., slots 24B in FIG. 6) to prevent UTC 20 from spinning or twisting within LTC 24 during the top plate assembly movement in a pressure test of a part. The tabs 20B are slightly smaller in width than slots 24B in LTC 24 allowing a free motion of the top plate assembly during testing.

Figure 6:
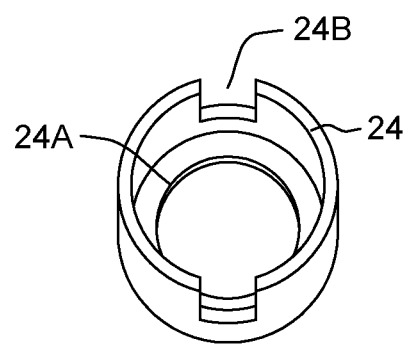
FIG. 6 is an illustration of a lower transducer column when removed from the pressure test apparatus, in accordance with an embodiment of the present invention.

FIG. 6 is an illustration of LTC 24 removed from the pressure test apparatus, in accordance with an embodiment of the present invention. As depicted in FIG. 6, LTC 24 is a portion of a hollow column with bottom ring 24A and a pair of slots 24B. While two slots 24B and two tabs 20B in FIG. 5 are depicted, any number of matching slots 24B and tabs 20B can be present in the pressure test apparatus. LTC 24 encases a portion of UTC 20, the female portion of the quick connect (not depicted) and can encase a portion of the male quick connect (not depicted). A portion of LTC 24 extends through c-shaped cut-outs in the top plate assembly. In various embodiments, bottom ring 24A extends inward toward a center point creating a ledge or ring that is under a collar of the female portion of the quick connect (depicted later in FIG. 8). In various embodiments, LTC 24 moves upward with an upward motion of the top plate assembly and bottom ring 24A moves the collar of the female portion of the quick connect up, disengaging the quick connect (e.g., the female portion of the quick connect releases the male portion of the quick connect).

Figure 7:
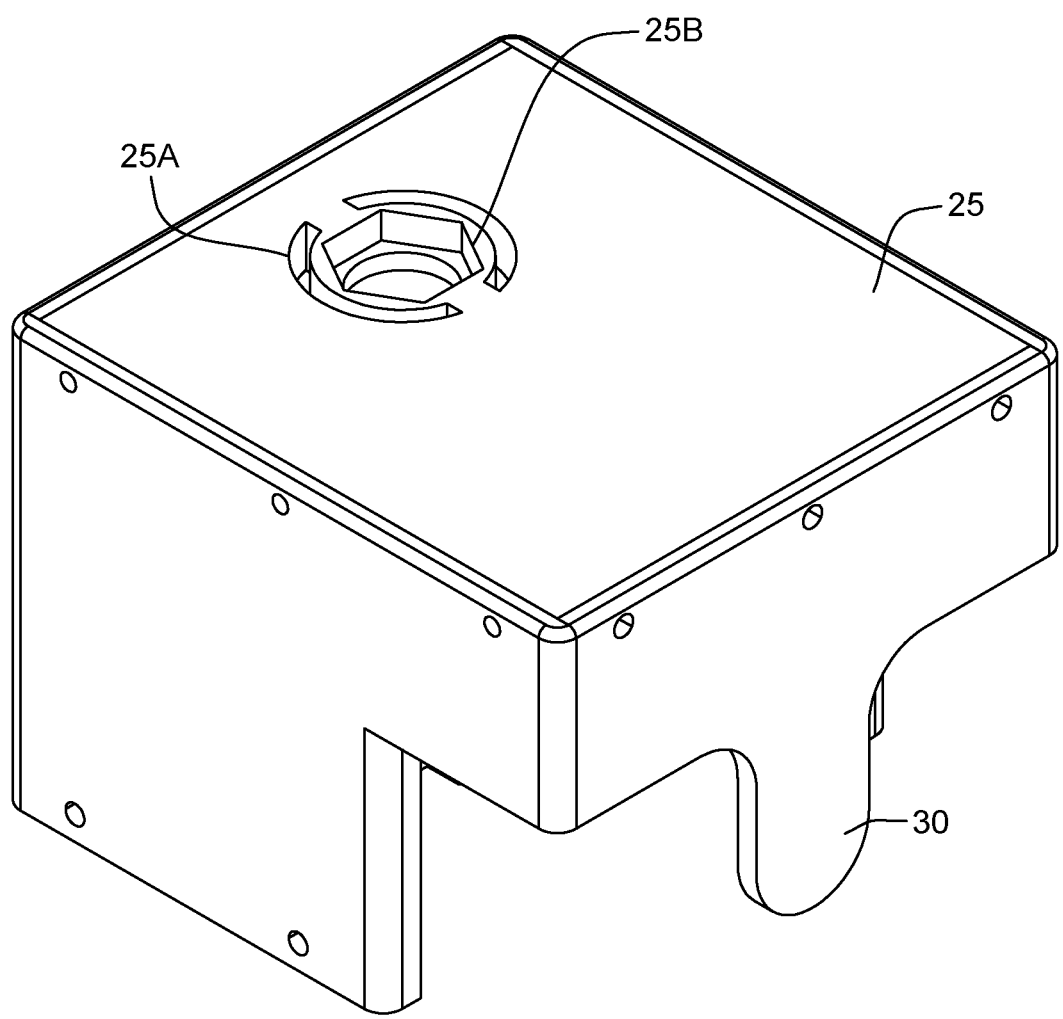
FIG. 7 is an illustration of a top surface and sides of a top plate assembly of the pressure test apparatus, in accordance with an embodiment of the present invention.

FIG. 7 is an illustration of a top surface and the sides of a portion of top plate assembly 25 of the pressure test apparatus, in accordance with an embodiment of the present invention. As depicted, FIG. 7 illustrates a portion of top plate assembly 25 with air block 30 on one of the four sides of top plate assembly and shows a top surface of top plate assembly 25 with cut out 25A and hex cut out 25B.

In various embodiments, cut outs 25A on the top surface of top plate assembly 25 are a pair of c-shaped cut-outs forming two parts of a circle or ring through which LTC 24 (not depicted in FIG. 7) extends. In various embodiments, a female portion of the quick connect resides partially or completely under the top portion of top plate assembly 25 in the area between cut outs 25A. In various embodiments, partial cut out 25B with a hexagonal shaped top portion of the cut out extending down to a circular bottom portion of hex cut out 25B. In some embodiments, hex cut out 25B is for a male-female hex thread adapter (not depicted) connecting the female portion of the quick connect to the transducer. The male-female hex thread adapter can also provide a connection to top plate assembly 25. In one embodiment, no male-female hex thread adapter is present and hex cut out 25B provides path for a direct connection of the female quick connect to the transducer. In this case, hex cut out 25B may have a round shape or a hexagonal shape as depicted in FIG. 7.

Figure 8:
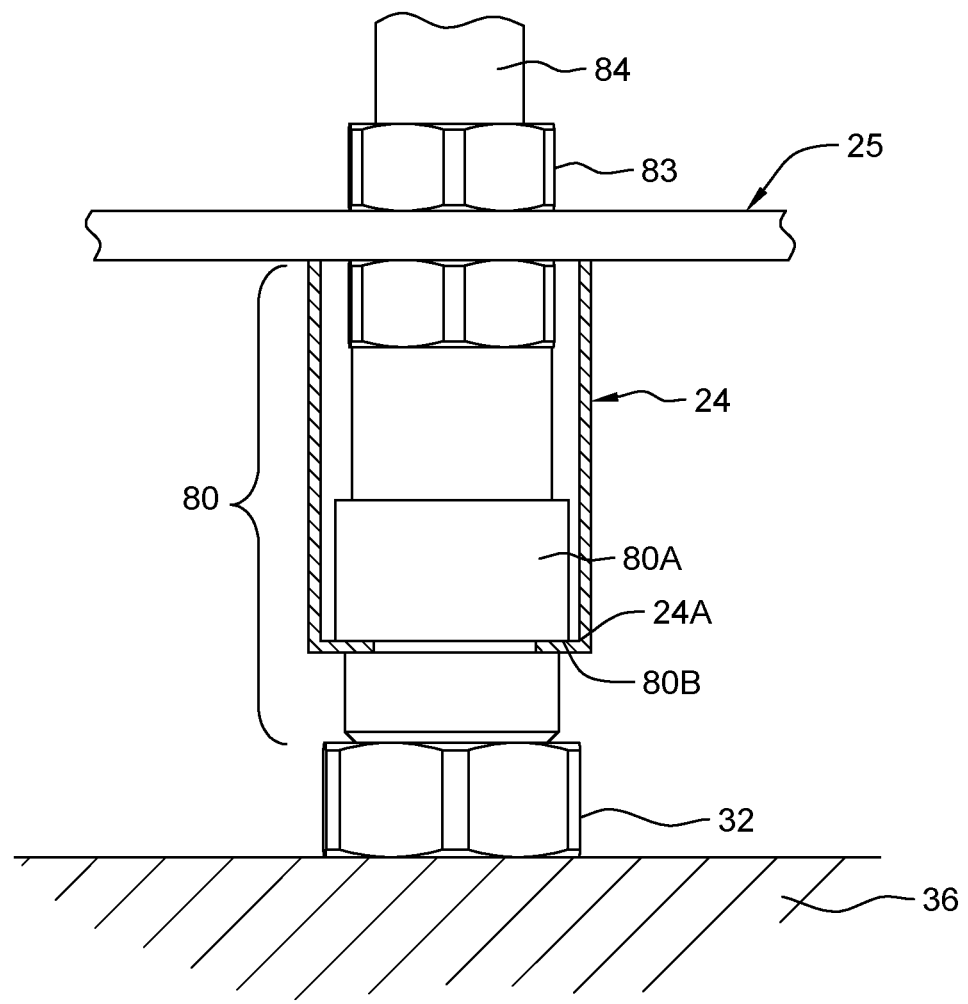
FIG. 8 is an illustration of a plurality of components within a portion of a central column of the pressure test apparatus, in accordance with an embodiment of the present invention.

FIG. 8 is an illustration of some of a plurality of components within a portion of a central column of the pressure test apparatus, in accordance with an embodiment of the present invention. As depicted, FIG. 8 includes a view of an upper portion of a quick connect labelled female connect 80, a lower portion of the quick connect that is male connect 32, a top portion of hold down plate 36, male-female hex thread adapter 83, a bottom portion of transducer 84, top plate assembly 25, a cut-away view of LTC 24 with bottom ring 24A extending under a bottom surface 80B of collar 80A in female connect 80. In various embodiments, female connect 80, upper portion of a quick connect, male-female hex thread adapter 83, a USB port (not depicted) and transducer 84 reside within one or both of the upper transducer column (e.g., UTC 20) and the lower transducer column (e.g., LTC 24) depicted in FIGS. 5 and 6 respectively. The upper portion of the quick connect identified as female connect 80 includes collar 80A of the quick connect with bottom surface 80B that is a bottom edge of collar 80A. In various embodiments, transducer 84 connects with an air passageway to the part in the pressure test apparatus for a pressure test when the top plate assembly (not depicted) is lowered.

As previously discussed, when the top plate assembly lowers, a bottom surface of the top plate assembly presses down on top surface female connect 80 to engage or join female connect 80 to male connect 32 of the quick connect (e.g., the quick connect snaps together male connect 32 and female connect 80 to provide a connection to transducer 84 during a pressure test). For example, as top plate assembly 25 lowers, the quick connect joins together and collar 80A snaps down. Transducer 84 disengages from the air passageway to the part, as previously discussed, when the bottom ring (depicted in FIG. 6) of the lower transducer column (e.g., LTC 24 not depicted) pulls up on bottom surface 80B of collar 80A. Raising the top plate assembly and therefore, moving bottom surface 80B of collar 80A upward releases the connection between female connect 80 and male connect 32 (e.g., disengages transducer 84).

Figure 9:
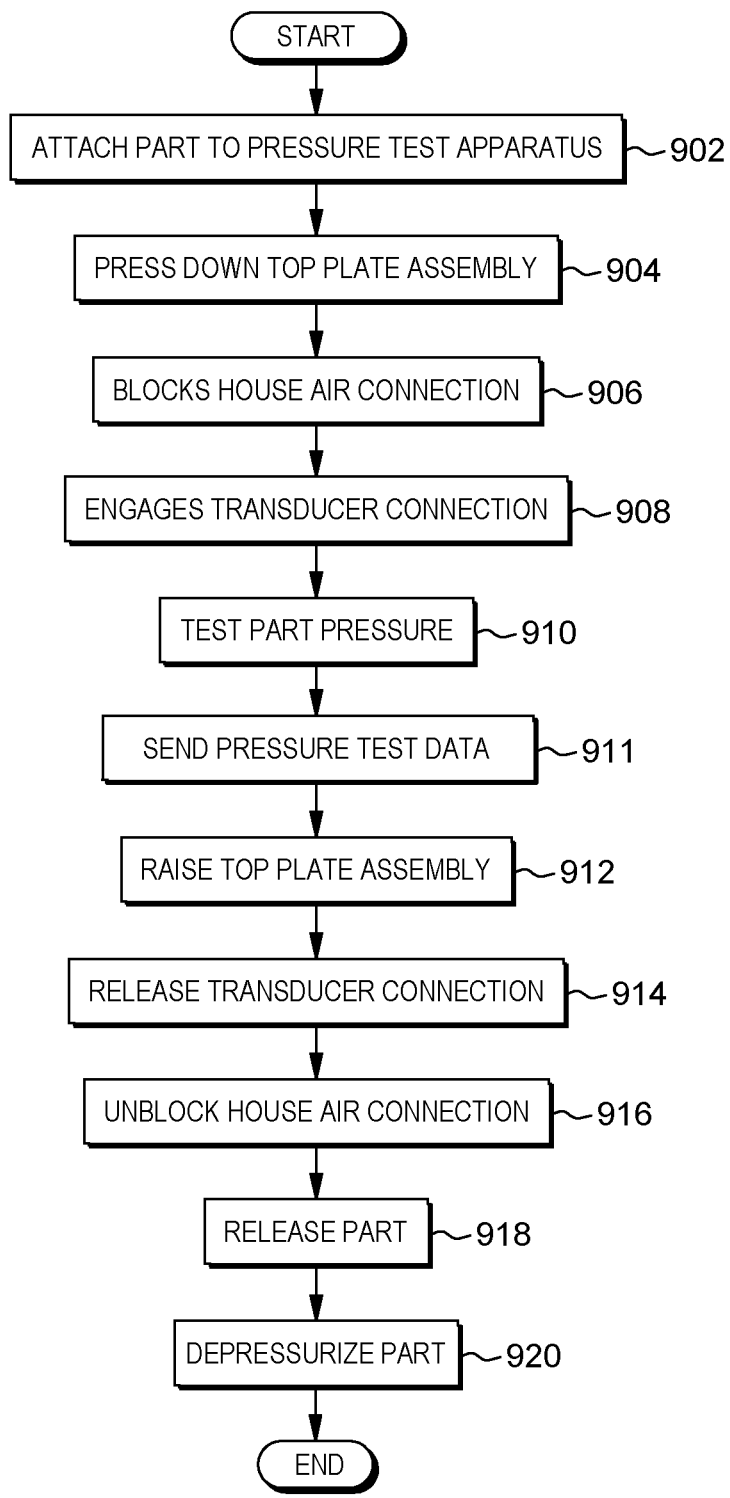
FIG. 9 is a flow chart depicting a plurality of operational steps in a pressure test using the pressure test apparatus, in accordance with an embodiment of the present invention.

FIG. 9 is a flow chart depicting a plurality of operational steps in a pressure test using the pressure test apparatus, in accordance with an embodiment of the present invention. As depicted, FIG. 9 illustrates an example of the steps of the pressure test of a part using the pressure test apparatus. In various embodiments, the steps include attaching the part to the pressure test apparatus, pressing down on the top plate assembly to engage the transducer connection and block the house air connection, testing the part pressure, raising the top plate assembly to release the transducer connection and unblock the house air connect, and release the part.

Attach part to pressure test apparatus (step 902) by connecting the part to the part connection, depicted as part connection 33 in FIG. 4. In various embodiments, the part is connected in the as-received state from a supplier (e.g., the part is received pressurized). For example, the part can be a manifold or any other type of part requiring an air tight or fluid tight seal. In some embodiments, the pressure test occurs after the part is pressurized using house air (e.g., in a pressure decay test).

Press down on top plate assembly (step 904). For example, an operator can gently push down on a top surface of the top plate assembly (e.g., depicted as top plate assembly 25 in FIG. 4) in order to engage a male portion of a connection to the transducer with a female portion of a connection to the transducer.

As the top plate assembly lowers and the connection between the male and female portions of the quick connect is being made, a portion of the top plate assembly (e.g., air block 30 in FIG. 4), blocks house air connection (step 906). The ability to physically block or prevent connection to house air during the pressure testing of the part provides a fail-safe way to ensure that incorrect or inaccurate part pressure readings do not occur as a result of a connection to house air during the part pressure test. In this manner, the pressure testing of the part will not allow part pressurization from a house air source during the pressure test. Allowing the connection to an air source during a pressure test could release a part to a manufacturing operation that does not have a required level of pressure or a required seal to prevent air or water from either entering a part or from entering a completed system after assembly. In this manner, the physical blocking of the house air connection prevents a source of operator error during the pressure test (e.g., attaching or leaving house air attached during the pressure test).

Engage transducer connection (step 908). In various embodiments, as the top plate assembly is lowered, a bottom surface of the top plate assembly presses down a collar of the female portion of the quick connect to engage or join with the male portion of the quick connect (e.g., the quick connect snaps together providing an airway through the male portion and the female portion of the quick connect to the transducer). For example, in some cases, when the connection between the male portion and the female portion of a quick connect is complete, an audible sound or click can be heard.

Test part pressure (step 910). For example, when the transducer is engaged and top plate assembly is lowered, as depicted in FIG. 3, then a pressure test of the part can occur. The pressure test can be performed using any suitable method of pressure testing. In one embodiment, an incoming part is initially connected to the pressure tester to verify that the part holds a set amount of pressure or a minimum pressure level. For example, a part passes the pressure test when the part's level of pressure is greater than 4 lbs./sq. in.

In various embodiments, any parts not initially holding greater than an initial required pressure (e.g., greater than 4 lbs./sq. in.) undergo a pressure decay test after failing an initial pressure test. For example, the part initially failing the first pressure test is connected to house air and pressurized to a certain level, such as, 24 lbs./sq. in. The house air is disconnected, and the top plate assembly is again lowered to re-engage the transducer after the house air is disconnected from the part. The re-pressurized part is held for a prescribed amount of time, such as two minutes, and then, a pressure reading is recorded. The part may pass the pressure decay test by maintaining a pre-determined amount or percent of pressure change (e.g., a change in pressure less than 1%) or in some cases, by maintaining a certain minimum pressure level over a prescribed time interval. In an embodiment, the initial pressure testing of a part is a pressure decay test.

After the pressure test is complete, in various embodiments, pressure test apparatus sends data (step 911) resulting from the pressure test to one or more computing devices using a USB port or a wireless connection. The data may include pressure test results, such as, a pressure level, a pass or fail of the pressure test, a pressure decay test result, or a number of pressure tests performed (e.g., pass/fail/total tests) for each part or for lot of received parts.

Raise the top plate assembly (step 912) by lifting the top plate assembly upward. For example, as an operator raises the top plate assembly, the pressure tester assembly releases the transducer connection (step 914). For example, as previously discussed with respect to FIG. 8, the upward lift of the ring in the lower transducer column raises the collar in the female portion of the quick connect releasing the connection between the female and the male portion of the quick connect. As the top plate assembly rises, the air block preventing a connection of an air source, such as, a house air line, also rises, unblocking the house air connection (step 916). After pressure test completion, the operator can release the part (step 918) by disconnecting the connection between the part and the pressure test apparatus (e.g., removes the part from part connect 33 in FIG. 4). In various embodiments, depressurize the part (step 920). For example, after the part is disconnected from the pressure test apparatus by releasing the quick connect to the transducer (e.g., connects 12A and 12B in FIG. 1), a hose connected to the part (e.g., by connects 11A and 11B) connects to a vapor separator hose (not depicted in FIG. 1) that allows de-pressurization to occur (e.g., using a vapor separator). After depressurizing the part, the pressure test process flow is complete, and the part can be removed from the pressure test apparatus.

The flowchart and block diagrams in the Figures illustrate the structure, functionality, and operation of possible implementations of pressure test apparatus and operating methods of a pressure test apparatus according to various embodiments of the present invention. In this regard, each block in the flowchart or block diagrams may represent a step, a segment, a portion of instructions, or actions. In some alternative implementations, the steps or functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and/or computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A pressure test apparatus, comprising:
    a top plate assembly including an air block, an upper transducer column, and a lower transducer column, wherein the upper transducer column and the lower transducer column encase a transducer and a first portion of a first quick connect, and wherein the top plate assembly moves vertically over a base of the pressure test apparatus; and
    the base of the pressure test apparatus includes a T-block with a hold down plate containing a second portion of the first quick connect and a passageway between the first quick connect, a second quick connect joining the pressure tester apparatus to a part to be tested, and a third quick connect joining an air source to the pressure tester apparatus.

2. The pressure test apparatus of claim 1, further comprising:
    moving the top plate assembly in a first direction connects the first connection portion of the first quick connect to the second portion of the first quick connect during a pressure test, wherein connecting the first portion of the first quick connect to the second portion of the first quick connect engages the transducer for the pressure test.

3. The pressure test apparatus of claim 2, wherein moving the top plate assembly in the first direction down blocks a portion of the third quick connect in the pressure test apparatus from joining the air source to the pressure tester apparatus during the pressure test.

4. The pressure test apparatus of claim 3, wherein moving the top plate assembly in the first direction blocks the portion of the third quick connect in the pressure test apparatus from joining the air source to the pressure tester apparatus during the pressure test, further comprises:
    an air block in a portion of the top plate assembly covers at least a portion of the third quick connect in the pressure test apparatus; and
    preventing the portion of the third quick connect in the pressure test apparatus from connecting the pressure tester apparatus to the air source during the pressure test, wherein the pressure test is one of a static pressure test or a pressure decay test of one of air pressure or fluid pressure.

5. The pressure test apparatus of claim 3, further comprising:
    performing a pressure test of the part to be tested;
    moving the top plate assembly in a second direction releases the first quick connect;
    disengaging the transducer in the pressure test apparatus by moving the top plate assembly in the second direction; and
    unblocking the portion of the third quick connect in the pressure test apparatus that connects to the air source to the pressure tester apparatus.

6. The pressure test apparatus of claim 2, wherein connecting the first portion of the first quick connect to the second portion of the first quick connect engages the transducer during the pressure test of the pressure test of the part to be tested, wherein the part to be tested is selected from the group consisting of a manifold in water-cooled computer system, a vessel, or a sub-assembly of components.

7. The pressure test apparatus of claim 2, wherein moving the top plate assembly in the first direction connects the first portion of the first quick connect to the second portion of the first quick connect during the pressure test, further comprises:
 a bottom surface of the top plate assembly lowers a collar in the first portion of the first quick connect joining the first portion of the first quick connect to the second portion of the first quick connect.

8. The pressure test apparatus of claim 7, further comprises:
 moving the top plate assembly in a second direction, wherein a bottom ring of the lower transducer column in the top plate assembly pulls in the second direction on the collar in the first portion of the first quick connect; and
 releasing the first quick connect.

9. The pressure test apparatus of claim 2, wherein moving the top plate assembly in the first direction includes sliding a set of four sides of the top plate assembly that extend downward from a rectangular top surface of the top plate assembly over four sides of the base of the pressure test apparatus to provide stability to the pressure test apparatus during the pressure test of the part.

10. The pressure test apparatus of claim 1, wherein the first quick connect is a self-sealing quick connect.

11. The pressure test apparatus of claim 1, wherein the second quick connect and the third quick connect are self-sealing quick connects.

12. The pressure test apparatus of claim 1, wherein the upper transducer column includes one or more protrusions fitted into a same number of one or more slots in the lower transducer column.

13. The pressure test apparatus of claim 1, wherein the upper transducer column includes a universal serial bus port connecting to one or more computing devices.

14. A method of performing a pressure test using a pressure test apparatus, the method comprising:
 attaching a part to be pressure tested to the pressure test apparatus by a third connection;
 moving a top plate assembly of the pressure test apparatus in a first direction, wherein the moving the top plate assembly in the first direction engages a first connection to a transducer for the pressure test and blocks a second connection of an air supply source to the pressure test apparatus, wherein the first connection, the second connection, and the third connection are formed by quick connects;
 blocking a portion of the second connection to one of the air source or the water line by an air block in the top plate assembly; and
 measuring a level of pressure in the part to be pressure tested.

15. The method of claim 14, wherein the moving top plate assembly in the first direction engages the first connection to the transducer, further comprises connecting a female portion of a first quick connect to a male portion of the first quick connect forming the first connection.

16. The method of claim 15, wherein when the female portion of the first quick connect and the male portion of the first quick connect forming the first connection are not engaged, the female portion of the first quick connect and the male portion of the first quick connect have a self-sealing capability.

17. The method of claim 14, further comprising:
 sending the level of pressure in the part to one or more computing devices via a USB port in a transducer column of the top plate assembly.

18. The method of claim 14, further comprising:
 determining that the level of pressure in the part to be pressure tested does not pass a minimum pressure level; and
 performing a pressure decay test on the part to be pressure tested.

19. The method of claim 14, further comprising:
 determining that the level of pressure in the part to be pressure tested meets a minimum pressure level;
 moving the top plate assembly in a second direction disengages the first connection to the transducer for the pressure test; and
 unblocking the second connection to the air source to the pressure test apparatus.

20. The method of claim 14, where in the part to be tested is one of a manifold in water-cooled computer system or a vessel, and wherein the pressure test is one of a static pressure test or a pressure decay test of one of air pressure or fluid pressure.

* * * * *